United States Patent Office 3,461,035
Patented Aug. 12, 1969

3,461,035
PROCESS FOR INCREASING THE YIELD OF YEAST
Robert S. Sellers, Huntington, Robert C. Nubel, Wantagh, and Robert A. Fitts, Huntington Station, N.Y., assignors to Chas. Pfizer & Co., Inc., New York, N.Y., a corporation of Delaware
No Drawing. Filed Nov. 13, 1963, Ser. No. 323,260
Int. Cl. C12c 11/00
U.S. Cl. 195—83                 3 Claims

ABSTRACT OF THE DISCLOSURE

Increased yield of *Saccharomyces cerevisiae* is obtained by propagating the yeast cells in an aqueous sugar solution containing a growth-supplementing agent prepared by removing the mycelium and citric acid from a citric acid fermentation liquor.

---

This invention relates to the cultivation of yeast. More particularly, it is concerned with improvements in processes for the preparation of yeast by the propagation of yeast cells in the presence of sources of carbon and inorganic salts.

It is a matter of common knowledge and experience that yeast is an especially valuable microorganism. For centuries, use has been made of various crude forms of yeast in the baking, brewing and wine making arts. However, the availability of yeast in the now familiar compressed cake form is a more recent development, dating back about 100 years or so. And, it is particularly noteworthy that during the past century numerous improvements have been proposed in processes for the production of compressed yeast; these have successfully increased the yield of yeast many-fold, based on the carbon source employed in the growth medium.

During the development of the art of yeast making to its present state, the following important factors appear: The nutrient medium must comprise aqueous solutions of carbohydrates and inorganic salts. It is necessary for the best yields that the said salts be present in adequate amounts and that the medium contain, in addition to a source of carbon, a source of nitrogen and phosphorus. It is necessary to provide large amounts of air during the propagation step to obtain best yields. Additional important factors in obtaining high yields of yeast are careful control of pH and of temperature. The carbon required in the nutrient medium is generally supplied in the form of sugar, and because of economic advantages, cane and beet molasses, which contain about 50% by weight of sugar, are the carbon sources of commercial choice.

In the present state of the art, the yield of yeast produced, based on weight of cells containing about 25 percent dry matter, is roughly equivalent to the weight of the molasses introduced. And, while this represents about a ten-fold increase in the yield of yeast over yields of 100 years ago it now surprisingly has been found possible to obtain a still further increase in yield. This is achieved by adding to the yeast propagation medium an inexpensive, growth promoting substance comprising a citric acid fermentation liquor from which the citric acid has been substantially removed. This substance is designated in the detailed description to follow and in the appended claims, citric acid recovery liquor. Yields obtained by the instant process are of the order of 110 to 120%, and even higher, based on 100% for the best commercial methods of the present art. Such an improved process is especially important in view of the facts that molasses cost represents a significant part of yeast production cost and the recent tendency of sugar prices to increase.

A further and especially important advantage in the instant process is the discovery of a "sugar-sparing" effect. Thus, the amount of sugar used can be partially replaced according to one embodiment. And, when the sugar replaced is in the form of relatively more expensive beet molasses, the instant process allows mixtures of beet and blackstrap molasses to be used with higher blackstrap ratios, without the development of off-colors and sludge in the yeast product.

It is, accordingly, a principal object of the instant invention to provide means to prepare yeast more economically than has heretofore been possible.

It is a further object to provide improved means for preparing high quality yeast from low cost carbon sources available in abundant supply.

It is a still further object to provide means to prepare yeast free from off-color and sludge at relatively high ratios of blackstrap to beet molasses. These and other objects readily apparent to those skilled in the art are easily achieved by practice of the process of the instant invention which, in essence, comprises: In a process for growing yeast including the step of propagating yeast cells in a sugar-containing nutrient medium, the improvement which comprises conducting said propagation in the presence of a growth-supplementing amount of citric acid recovery liquor.

The essence of the invention, in its broadest aspects, resides in the discovery that the addition of a mycelium-free, substantially citric acid-free spent fermentation liquor to the wort in which yeast cells are propagated causes a marked increase in the yield of yeast obtained. This increase is readily apparent by conducting the yeast propagation in the absence of the added citric acid recovery liquor, determining the amount of cells obtained, and then to repeating the propagation of yeast in the presence of the said liquor. Typically, it is found that the use of the spent liquor to supplement the medium results in increases of from at least 10% and up to 20%, and even more, in the total yield of yeast cells obtained. While the reason for the substantial increase effected by addition of the said liquor is not clearly understood at this time, the effect is substantial and reproducible and, as mentioned, results in a considerable decrease in the cost of production of yeast.

The amount of spent liquor added to the wort in which the yeast is propagated does not appear to be critical. All that is required is that enough be present to provide a growth-supplementing amount of the required factors. The formulation of the desirable medium is readily within the capabilities of those skilled in the art and the amount to be added will depend on the degree of concentration, if any, of the citric acid recovery liquor.

Special mention is made of the following convenient embodiment of the instant invention: A process for increasing the yield of yeast which comprises propagating yeast cells in an aqueous sugar solution to which has been added in an amount to provide from about 3 to about 18 parts by weight per part by weight of said sugar a yeast growth-supplementing agent prepared by separating the mycelium and citric acid from a citric acid fermentation liquor. This embodiment contemplates the use of sugar in its relatively pure forms or in cruder forms such as molasses, which generally contains about 50% by weight of sugar. It has been found that the growth-supplementing effect of citric acid recovery liquor is especially pronounced at levels between about 3 parts and about 18 parts by weight of the said liquor per part by weight of the said sugar. Of course, as would be readily apparent to those skilled in the art, concentration of the recovery liquor to remove large quantities of water will cause these ratios correspondingly to decrease. For example, if the liquor is concentrated to about 1/15 of its original volume, then an especially convenient range of concentrated liquor to use would be from about 2 to about 12 parts by weight per 10 parts of the said sugar. Below these levels there is some small tendency for the yield of yeast to decrease and above these levels, there does not appear to be any particular advantage in terms of yields obtained.

Particular mention is made of an embodiment of the instant invention in which the said sugar-containing nutrient medium comprises a mixture of molasses: In a process for propagating yeast cells in a nutrient medium containing a mixture of beet molasses and blackstrap molasses, the improvement which comprises replacing between about 1% and 15% by weight of the beet molasses with citric acid recovery liquor in an amount to provide from about 1 to about 3 parts by weight of the said molasses mixture. This represents an improvement in prior art processes, said improvement effecting a sugar-sparing effect. This is partcularly important in mixtures of molasses of relatively different costs, such as beet and blackstrap mixtures. At the present time, beet molasses costs about 50% more than does blackstrap. It is economical, therefore, to use as much blackstrap as possible although the total amount is limited by the well-known tendency of blackstrap to cause sludge development in the fermenter and color formation in the yeast. By use of the instant embodiment, however, as will be exemplified in detail hereinafter, the more expensive beet molasses can be partially replaced, the blackstrap level can be maintained, and the same amount of yeast free from sludge and color can be obtained more economically.

A still further embodiment of the instant invention is application of the process to straight molasses or to mixtures of molasses to increase the yields of yeast: In a process for propagating yeast cells in a nutrient medium containing a mixture of beet molasses and blackstrap molasses, the improvement which comprises adding to said mixture citric acid recovery liquor in an amount to provide from about 1.5 to about 9 parts by weight per part by weight of said mixture. Here, the preferred amounts of unconcentrated citric acid recovery liquor to be employed are from about 1.5 parts to about 9 parts by weight per part by weight of molasses. The embodiment can also be practiced using concentrated liquor as described hereinbefore; at a 1/15 concentration, for example, the preferred ranges are from about 1 to about 6 parts by weight of concentrated liquor per 10 parts by weight of molasses.

The preparation of the citric acid recovery liquor used in the instant process is easily within the capabilities of those skilled in this art. The nature of the citric acid fermentation process employed is not critical, either classical submerged or surface fermentation processes will provide satisfactory citric acid recovery liquors. A detailed preparation for one such method is set forth hereinafter.

Generally speaking, the spent citric acid fermentation liquor can be obtained by the following process, which is outlined in the well-known standard reference work, Prescott and Dunn, Industrial Microbiology, 3rd ed., New York, McGraw-Hill Book Co., Inc., 1959: A citric acid fungus such as *Aspergillus niger, A. clavatus, Penicillium lutium, P. citrinum, Mucor piriformis,* or *A. wentii*, and the like, may be fermented in an aqueous nutrient medium, in the presence of a carbohydrate, such as sucrose and fructose, glucose, and the like, and inorganic salts providing growth factors such as nitrogen, potassium, phosphorus, sulfur, and magnesium, under controlled conditions of pH, temperature, and aeration until fermentation is complete; this generally requires a matter of from about 3 to about 10 days. The yield of citric acid, based on the sugar compound used, will usually be about 60%. After fermentation is complete, the solution is separated from the mycelium which forms during fermentation. If a surface fermentation is used, the mat can be separated simply by draining the solution and pressing the mat to remove any acid contained in it. On the other hand, if a submerged fermentation process has been used, it may be more convenient to use filtration to remove the mat. The citric acid is conveniently separated from the spent liquor by precipitation as its relatively insoluble calcium salt. The calcium citrate is separated and the spent liquor, substantially free from mycelium and citric acid, designated citric acid recovery liquor, can be used directly to supplement the wort used in propagating yeast. It is more convenient, however, because it decreases weight and volume, to concentrate the said medium to from about 1/10 to about 1/15 of its original volume by distilling the excess water from the medium, preferably, in a vacuum.

In carrying out the process of this invention, standard techniques developed for propagating yeast are employed. In general, the sugar solution is adjusted to pH 3.5–4.5 and if molesses is used, it may be diluted. The propagation is carried out in a sterile fermentation vessel provided with an inlet through which air rapidly can be passed. The reaction vessel is partially filled with water in which chemicals providing phophorus, nitrogen, sulfur, and magnesium have been dissolved. It is especially convenient to add the citric acid recovery liquor to the sugar solution and then to dilute the resulting solution with water to prepare a concentrated feed wort which is added slowly to the propagation vessel during yeast growth. Slow addition of the wort provides a low concentration of sugar, generally a fraction of a percent, in order to keep the amount of undesirable alcohol production at a minimum. The total fermentation time is usually of the order of about 12 hours. The temperature of the reactor is maintained at or below about 30° C. The pH of the reaction of the propagation mixture is maintained at about 3.5 to 4.5 by adding an appropriate reagent such as a combination of aqueous ammonia and ammonium sulfate during the propagation step. After propagation, the creamed yeast is cooled, is separated from the spent wort and is washed several times. The washed yeast then be recovered by filtration and is prepared, for commercial use, as a compressed cake of solid cells.

The following represents one detailed process for the preparation of a growth-promoting medium useful in the preparation of the process of this invention. Of course, this invention is not limited to the use of the preparation outlined, many variations of which are possible and readily within the skill of those in the art to which this inventin pertains.

PREPARATION

Yeast cell growth-stimulating liquor.—A medium of the following composition is prepared:

| | G./liter |
|---|---|
| Sucrose | 140 |
| $NH_4NO_3$ | 2.25 |
| $KH_2PO_4$ | 1.00 |
| $MgSO_4 \cdot 7H_2O$ | 0.25 |

Distilled water to make 1 liter.

An amount of $FeNH_4(SO_4)_2 \cdot 12H_2O$ sufficient to provide 0.1 mg. of Fe and sufficient HCl to abjust the medium to pH 2.3 are added. The medium is transferred to flat bottles and is sterilized at 8 to 10 lbs. of steam pressure per square inch for about 30 minutes. The sterile medium is then inoculated with spores of *A. niger*, strain No. 1015, American Type Culture Collection, Washington, D.C., and incubated in shallow layers at 30° C. for 9 days.

At the completion of fermentation, the solution is drained off and the mat is pressed to remove any residual moisture. The citric acid is precipitated from the hot neutralized mycelium-free solution as its calcium salt by adding pulverized calcium carbonate and the calcium citrate is filtered off.

The filtrate, now free of mycelium and substantially free of citric acid, is concentrated by distillation in a vacuum until the final volume is 1/15 of the initial. The concentrated filtrate is suitable for use in practicing the instant process.

If, instead of using a concentrated citric acid recovery liquor, it is desired to use the unconcentrated liquor, as is shown in several of the examples, the distillation step is simply omitted. It is preferred, however, for economy in shipping and because more concentrated worts can be employed, to remove a substantial portion of the water from the citric acid recovery liquid.

The present invention is further illustrated in the following examples. It is to be understood that these examples are given by way of illustration and not of limitation.

EXAMPLE I

Propagation of yeast in 50:50 beet molasses-blackstrap molasses medium without supplementation.—A mixture of 73 g. of beet molasses and 73 g. of blackstrap molasses is diluted to a final volume of 200 ml. with water and adjusted to pH 5 to make a concentrated feed wort.

A clean, sterilized 4-liter fermenter, fitted with an agitator and air sparger, is charged with a starting solution comprising 1800 parts of water in which is dissolved 4.4 g. of $Na_2HPO_4 \cdot 12H_2O$, 0.86 g. of $(NH_4)_2SO_4$, and 0.18 g. of $MgSO_4 \cdot 7H_2O$. The fermenter is steamed for 60 minutes at atmospheric pressure to insure sterility.

A chemical feed liquor for incremental addition during the yeast propagation step is prepared comprising 6.2 g. of $NH_4OH$ (as a 29% $NH_3$-containing solution), 6.6 g. of $(NH_4)_2SO_4$ and enough water to provide a final volume of 200 ml.

A seed yeast is prepared by suspending a slant of *Saccharomyces cerevisiae* in 50 ml. of sterile water. Then 2 ml. of the suspension containing about $126 \times 10^3$ cells/ml., is used to inoculate 1 liter portions of a sterile medium of the following composition:

| | G./l. |
|---|---|
| Beet molasses | 37.5 |
| Blackstrap molasses | 3.84 |
| $(NH_4)_2HPO_4$ | 2.3 |
| $MgSO_4 \cdot 7H_2O$ | 0.1 |

Water to make 1000 ml.

The inoculated media are incubated at 28° C. on a rotary shaker for 16 hours to obtain the seed yeast.

The yeast propagation is started my adding 200 ml. of the seed yeast suspension to the agitated, aerated fermenter. Aeration is maintained at the rate of 1 volume of air per volume of liquid per minute. The fermenter temperature is controlled with an external water bath maintained at 30° C.

One hour after inoculation, the concentrated feed wort and chemical feed liquor are fed simultaneously to the propagator during 12 hours according to the following schedule:

| Hours after start | Feed wort and chemical feed liquor, each, ml. | Molasses added per hr., g. | Feeds per hr. (every 15 min.) |
|---|---|---|---|
| 1 | 1.8 | 5.2 | 4 |
| 2 | 2.1 | 6.1 | 4 |
| 3 | 2.45 | 7.15 | 4 |
| 4 | 2.9 | 8.4 | 4 |
| 5 | 3.4 | 9.9 | 4 |
| 6 | 4.0 | 11.7 | 4 |
| 7 | 4.7 | 13.7 | 4 |
| 8 | 5.55 | 16.2 | 4 |
| 9 | 6.5 | 19.0 | 4 |
| 10 | 7.6 | 22.2 | 4 |
| 11 | 9.0 | 26.3 | 4 |
| 12 | 0 | | 0 |

The yeast is separated from the spent wort by means of filtration and the cream so obtained is dried to a constant weight at 60° C. to determine the yield on a dry-cell basis. A good yield is obtained and, for control purposes, is designated 100% under these conditions.

Propagation of yeast in 50:50 beet molasses-blackstrap molasses medium with supplementation.—The procedure is repeated adding to the concentrated feed wort 21.9 g. of citric acid recovery liquor prepared as described hereinbefore. This provides a wort in which the ratio of beet molasses to blackstrap molasses to spent citric liquor is 5:5:1.5. After propagation and isolation there is obtained a yield of yeast equivalent to 112.3% when compared to the control, designated 100%.

Similarly, repetition of the procedure with supplementation by citric acid recovery liquor to provide beet-blackstrap recovery liquor ratios of 5:5:2; 5:5:3 and 5:5:4, respectively, provided increases, based on 100% for the control, in the yield of yeast obtained of 117; 112 and 115%. Thus the beneficial effect on yield caused by addition of spent citric liquor is clearly demonstrated.

Substantially the same results are obtained if, instead of for each part by weight of the concentrated recovery liquor, 15 parts by weight of unconcentrated recovery liquor are employed. The yield increasing effect is also demonstrated at beet-blackstrap-recovery liquor ratios of 5:5:15; 5:5:30; 5:5:45; 5:5:60 and 5:5:90 or, based on molasses-recovery liquor ratios, from 1.5 to 9 parts by weight of straight, unconcentrated recovery liquor per part by weight of molasses.

EXAMPLE II

Propagation of yeast in 7030 beet molasses-blackstrap molasses medium without supplementation.—The procedure of Example I is repeated substituting for the concentrated feed wort therein described, a feed wort comprising a mixture of 102.2 g. of beet molasses and 43.8 g. of blackstrap molasses and enough water to provide 200 ml. After propagation and isolation the product contains a good yield of yeast cells, designated, for control purposes, 100%.

Propagation of yeast in a 70:30 beet molasses-blackstrap molasses medium with supplementation.—The procedure is repeated adding to the concentrated feed wort 21.9 g. of citric acid recovery liquor. The yield of yeast, compared with 100% for the control, is 109%, thus demonstrating the beneficial effect of supplementation.

EXAMPLE III

Propagation of yeast in a wholly blackstrap molasses medium without supplementation.—The procedure of Example I is repeated substituting for the concentrated wort therein described a feed wort comprising 146.2 g. of blackstrap molasses and enough water to provide 200 ml. total. After propagation and isolation there is obtained a good yield of yeast cells, designated, for control purposes, 100%.

Propagation of yeast in a wholly blackstrap molasses medium with supplementation.—The procedure is repeated adding to the concentrated feed wort 95.0 g. of citric acid recovery liquor. This is a blackstrap molasses to recovery liquor ratio of 10:6.5. The yield of yeast, based on 100% for the control, is 121.5%, thus demonstrating the beneficial effect of supplementation.

EXAMPLE IV

Propagation of yeast in a medium in which molasses has been partially replaced with citric acid recovery liquor.—The procedure of Example II is repeated, substituting for 102.2 g. of beet molasses, 80.3 g. (the total sugar content is thus reduced 15%) and adding to the feed wort 14.6 g. of concentrated citric acid recovery liquor. After fermentation there is obtained a yield of yeast equivalent to that of the control, which is made with more sugar. This demonstrates that the more expensive molasses component can be replaced in the new process. No deterioration in color is observed because the total quantity of blackstrap molasses remains the same.

Similarly, it is found that 1% of the beet molasses can be replaced by supplementing the concentrated feed wort with from 1 part to 3 parts of unconcentrated citric acid recovery liquor per part of total molasses remaining.

What is claimed is:
1. In a process for increasing the yield of *Saccharomyces cerevisial* by propagating the cells of said yeast in an aqueous sugar solution the improvement which comprises adding in an amount to provide from about 3 to about 18 parts by weight per part by weight of said sugar a yeast growth-supplementing agent prepared by removing the mycelium and citric acid from a citric acid fermentation liquor.
2. The process of claim 1 wherein the principal sugar source in the said aqueous sugar solution is molasses.
3. The process of claim 1 wherein the principal sugar source in the said aqueous sugar solution is a mixture of best molasses and blackstrap molasses.

References Cited

FOREIGN PATENTS 802,487  10/1958  Great Britain.

OTHER REFERENCES

Cook, A. H.: The Chemistry and Biology of Yeasts, Academic Press Inc., New York, 1958, pp. 537–538 and 558–561.

LIONEL M. SHAPIRO, Primary Examiner

D. M. NAFF, Assistant Examiner

U.S. Cl. X.R.

195—100, 114